E. B. KUNKLE.
Water-Gage for Steam-Boilers.
No. 210,261. Patented Nov. 26, 1878.
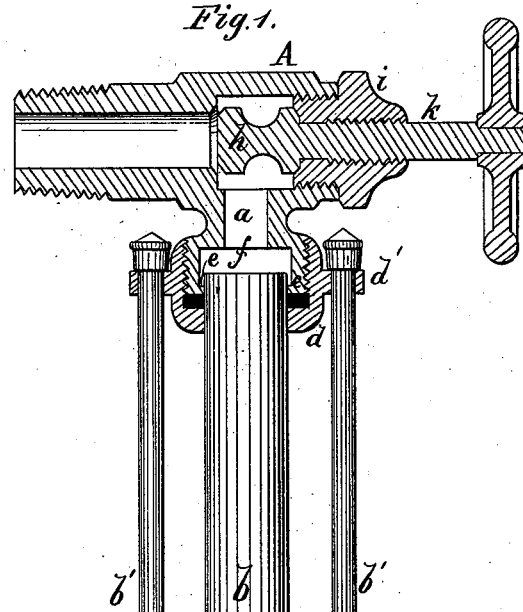
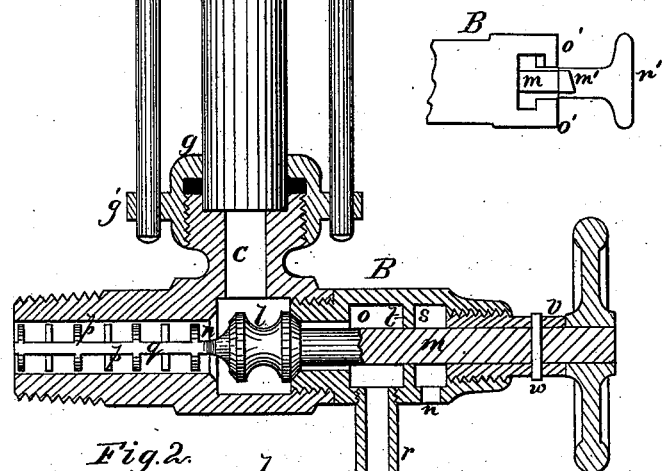
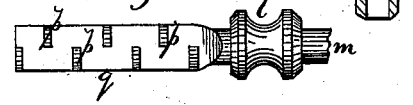
WITNESSES:
Henry N. Miller
C. Sedgwick
INVENTOR:
E. B. Kunkle
BY Munn & Co
ATTORNEYS.

UNITED STATES PATENT OFFICE.

ERASTUS B. KUNKLE, OF FORT WAYNE, INDIANA.

IMPROVEMENT IN WATER-GAGES FOR STEAM-BOILERS.

Specification forming part of Letters Patent No. 210,261, dated November 26, 1878; application filed October 4, 1878.

*To all whom it may concern:*

Be it known that I, ERASTUS B. KUNKLE, of Fort Wayne, in the county of Allen and State of Indiana, have invented a new and Improved Water-Gage for Steam-Boilers, of which the following is a specification:

My improvements relate to means for keeping the water-cock free from sediment and scale, and to the construction of the steam and the water cock, whereby certain advantageous features are obtained.

The invention consists in scrapers or cleaners formed upon the valve-stem of the water-cock, which scrapers are self-acting to free the cock from scale; in a vacuum-chamber at the outer end of the water-cock, to prevent the escape of hot water around the valve-stem; in constructing the cock so that the valves may be ground to their seats; and in certain other details of construction, hereinafter set forth.

In the accompanying drawing, Figure 1 is a sectional elevation of my improved water-gage. Fig. 2 is an elevation of the double-seated valve of the water-cock and the scrapers of the valve-stem. Fig. 3 is an end view of the same, and Fig. 4 is a modification of locking device shown in Fig. 1.

Similar letters of reference indicate corresponding parts.

A is the steam-cock, provided with the passage $a$ to the upper end of the glass tube $b$; and B is the water-cock, that has a passage, $c$, to the lower end of glass tube $b$. The upper end of the tube $b$ is packed by a packing-ring, $d$, that screws upon the cock A, and the opening $f$ for the tube is formed with an inner flange, $e$, that holds the tube $b$ central. The opening $f$, above the flange $e$, is enlarged to permit the tube $b$ to be moved perpendicularly, thereby facilitating its introduction into the water-cock. $g$ is a screw packing-ring at the lower end of tube $b$, where it connects to water-cock B. The rings $d$ and $g$ are provided with flanges $d'$ $g'$, respectively, for carrying the guard-rods $b'$. $h$ is the valve of steam-cock A. It is formed double-seated, as shown, one seat closing the passage to the boiler, and the other seat closing against the nut $i$ when the steam-passage is open, to prevent leakage around the valve-stem $k$. The stem $k$ is threaded and works in a screw-thread in nut $i$. This valve $h$ can be ground to its seat by unscrewing the nut $i$ from cock A, and turning the valve-stem to grind the seats. $l$ is the valve of the water-cock B, upon a stem, $m$. One seat of valve $l$ closes the passage $n$ to the boiler, and when the passage $n$ is open the other seat of the valve closes the blow-off opening $o$.

The stem $m$ is extended beyond the valve $l$ into the water-passage $n$, the extended portion being in the shape of a flattened rod, $q$, having upon its two surfaces a series of scrapers, $p$, placed alternately, as seen in Fig. 2. When the valve is opened and closed the flattened portion $q$ and scrapers act to loosen and dislodge sediment and scale in the passage $n$, being thus self-acting to keep the cock free.

$r$ is the nose-piece or discharge-pipe, through which the gage is blown off. To prevent steam or water from coming out at the end of the cock and scalding the operator, I form a vacuum-chamber, $s$, which is separated from the blow-off passage by a partition, $t$. Any steam or water which passes through the partition around the stem $m$ will go out by the opening $u$ in the under side of the chamber $s$, and act to create a vacuum in chamber $s$, so that no steam or water can be forced out around the valve stem or thread at the end of cock B. $v$ is a sleeve upon the stem $m$, the outer surface of which sleeve is screw-threaded to engage with the thread on the end of B. The sleeve $v$ and stem $m$ are connected together by a cross-pin, $w$. The object of this arrangement is to permit of the stem and valve being turned independently of the sleeve and cock when it is desired to grind the valve $l$ to its seat, which will be permitted by driving out the pin $w$.

In place of the sleeve $v$ and screw-thread for operating the valve $l$, the locking device shown in Fig. 4 may be used. In that figure the stem $m$ is formed with tapering lugs $m'$ and a knob, $n'$, at its end, by which the stem is slid in or out. When the stem $m$ is pushed in to open the blow-off passage, the lugs $m'$ are to be turned behind the flanges $o'$ on the end of cock B, to lock the valve in place.

The gage above described has but few pieces in comparison with gages heretofore made, and is not liable to get out of order. The seats of the valve can be readily ground if they are cut by the steam, and thereby prevented from leaking.

The flattened extension $q$ of the valve-stem $m$ may be provided with the scrapers $p$ or not. It will be efficient for the purposes intended in either case.

Having thus fully described my invention, I claim as new and desire to secure Letters Patent—

1. The valve-stem of the water-cock B, having a flattened extension, $q$, and scrapers $p$, substantially as and for the purposes set forth.

2. The chamber $s$, combined and arranged in connection with the blow-off opening of the cock B, substantially as and for the purposes set forth.

3. The combination of the sleeve $v$ and cross-pin $w$ with the valve-stem $m$ and cock B, for the purposes described, and as set forth.

ERASTUS BOICE KUNKLE.

Witnesses:
 REUBEN BOSTICK,
 JOS. V. LETOT.